(12) United States Patent
Boggs et al.

(10) Patent No.: US 6,824,734 B2
(45) Date of Patent: Nov. 30, 2004

(54) METHOD OF PRODUCING LATENT ELASTIC, CROSS-DIRECTION-ORIENTED FILMS

(75) Inventors: Lavada Campbell Boggs, Marietta, GA (US); Hannong Rhim, Roswell, GA (US); William Bela Haffner, Kennesaw, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 182 days.

(21) Appl. No.: 09/973,683

(22) Filed: Oct. 9, 2001

(65) Prior Publication Data

US 2003/0068951 A1 Apr. 10, 2003

(51) Int. Cl.[7] .................................................. B29C 47/90
(52) U.S. Cl. .................. 264/567; 264/17.13; 264/209.5
(58) Field of Search ................................ 264/563, 564, 264/565, 567, 173.14, 209.5; 428/98, 332

(56) References Cited

U.S. PATENT DOCUMENTS

| | | | | |
|---|---|---|---|---|
| 3,456,044 A | * | 7/1969 | Pahlke | ........................ 264/567 |
| 4,277,578 A | | 7/1981 | Yoshimura et al. | |
| 4,358,330 A | | 11/1982 | Aronovici | |
| 4,828,891 A | | 5/1989 | Lustig et al. | |
| 5,082,616 A | | 1/1992 | White et al. | |
| 5,219,666 A | * | 6/1993 | Schirmer et al. | ............ 428/521 |
| 5,298,202 A | | 3/1994 | Schirmer | |
| 5,350,471 A | | 9/1994 | Planeta | |
| 5,540,881 A | | 7/1996 | Varadi | |
| 5,591,390 A | | 1/1997 | Walton et al. | |
| 5,595,705 A | | 1/1997 | Walton et al. | |
| 5,925,305 A | | 7/1999 | Takashige et al. | |
| 6,162,318 A | | 12/2000 | Planeta et al. | |
| 6,376,095 B1 | * | 4/2002 | Cheung et al. | ............. 428/516 |
| 6,488,972 B1 | * | 12/2002 | Cerani | ........................ 426/110 |

FOREIGN PATENT DOCUMENTS

| | | |
|---|---|---|
| DE | 1 164 645 | 3/1964 |
| EP | 0 206 826 A2 | 12/1986 |
| EP | 0 259 246 A2 | 3/1988 |
| EP | 0 974 452 A2 | 1/2000 |
| GB | 1 560 550 | 2/1980 |
| WO | WO 01/70483 | 9/2001 |

OTHER PUBLICATIONS

Song, Kwangjin and White, James L., *Double Bubble Tubular Film Extrusion of Polybutylene Terephthalate–Polyethylene Terephthalate Blends*, Polymer Engineering and Science, Apr. 2000 (vol. 40, No. 4), pp. 902–916.
Encyclopedia of Polymer Science and Engineering, A Wiley–Interscience Publication, John Wiley & Sons, vol. 3, 299–300, 1985.
Song et al.: Double Bubble Tubular Film Extrusion of Polybutylene Terephthalate–Polyethylene.
Terephthalate Blends, Polymer Engineering & Science, Society of Plastics Engineers, pp. 902–916, XP–000927556, vol. 40, No. 4, Apr. 2000.

* cited by examiner

*Primary Examiner*—Mark Eashoo
(74) *Attorney, Agent, or Firm*—Pauley Petersen & Erickson (57) ABSTRACT

A blown film process for producing low gauge, latent elastic films with high cross-direction orientation includes preferentially regulating the temperature gradient of the film along the expansion length. The regulation of temperature along the bubble profile allows more effective "down gauging" of the film and improved melt strength of the hot film. The choice of raw materials is an important element in producing cross-direction-oriented, low gauge, latent elastic films. The method of this invention can be carried out as either a multiple-bubble process or a single-bubble process.

32 Claims, 6 Drawing Sheets

METHOD OF PRODUCING LATENT ELASTIC, CROSS-DIRECTION-ORIENTED FILMS

FIELD OF THE INVENTION

This invention relates to a blown film process for producing latent elastic films with high cross-direction orientation.

BACKGROUND OF THE INVENTION

Thermoplastic elastomers and their blends and compounds have inherent set characteristics, resulting in "latent" elastic behavior. Elasticity retrieval is most commonly performed by heat shrinking, although several other methods may be employed, including chemical and microwave treatment. Traditionally, the latent character of thermoplastic elastomers is introduced by stretch-orienting under cold or tepid conditions, annealing, and quenching to preserve the fixed "strained" state of the film. The orientation temperature profile is chosen to deliver certain shrink material mechanical properties, such as shrink tension and shrink percentage. Stretching may be performed uni-, bi- or omnidirectionally. Whether stretch orientation is performed in-line with the extrudate production or subsequent to it, the orientation temperature profile is determined by the thermal transitions exhibited by the specific polymer, blend or formulation. Generally accepted analysis methods for determining these various transition temperatures include Differential Scanning Calorimetry (DSC) and Differential Thermal Analysis (DTA). These transitions are generally known by those skilled in the art to coincide with crystallites induced by mechanical strain or crystalline regions from the ensuing polymer chemistry.

In the general processing scheme for blown film, particularly single stage blown film, the temperature is not specifically regulated or optimized along the profile of strain-induced orientation. Furthermore, film blowing involves a complex set of interactions between the melt rheology of the extrudate, heat transfer in the changeover from the viscous melt to solid state, and the extensional properties influencing the morphology formation of the film. If the temperature is not properly regulated, premature film breakage causing low yields, bubble instability resulting in poor tension control, and non-uniform gauge and variable through-roll morphology profile are some of the problems encountered in film production. Additionally, due to the elastic nature of these films, bi-directional stretching is further complicated by the inherent nature of the film to spring back during stretch orientation. Furthermore, in the control of elastic material in second stage or post-stretching processes that utilize tenter frames or differential speed, biaxial calender rolls are particularly problematic.

There is thus a need or desire for a method of producing latent elastic films that alleviates the aforementioned problems.

There is a further need or desire for a latent elastic material whereby substantial levels of latent set can be introduced to achieve high shrinkability without compromising the need for low tension set in the post-shrunk material.

SUMMARY OF THE INVENTION

The present invention is directed to a blown film process for producing latent elastic films with high cross-direction orientation. In this process, the temperature gradient is preferentially controlled along the expansion length. The regulation of temperature along the bubble profile allows more effective "down gauging" of the film and improved melt strength of the hot film.

In one embodiment of this invention, a multiple bubble process is employed. In this process a film is blown to minimally orient and sufficiently down gauge the film at elevated temperatures above the melting point. The film is then collapsed. The film is then re-blown at pre-determined stretch, annealing and quench temperatures specified along the bubble expansion path, while simultaneously substantially orienting and completing the final down gauging of the film.

In another embodiment of this invention, a single bubble process is employed. In this process a multi-ring system, an internal bubble cooling system, an internal cooling system, and/or an external air cooling system is used to control the bubble expansion and temperature profile during bubble expansion as the film is down gauged, oriented and set.

The blown film method of the invention applies to both single and multi-component, co-extruded films. Adequate melt strength to maintain the integrity of the film while simultaneously orienting and thinning the film are important process elements in producing cross-direction-oriented, low gauge, latent elastic films.

With the foregoing in mind, it is a feature and advantage of the invention to provide a method of making cross-direction-oriented, low gauge, latent elastic films wherein premature breakage and skin layer separation is minimized and/or eliminated.

This and other features and advantages will become further apparent from the following detailed description of the presently preferred embodiments, read in conjunction with the drawings.

DEFINITIONS

"Blown film" or "film blowing" refers to a process for making a film in which a thermoplastic polymer or co-polymer is extruded to form a bubble filled with heated air or another hot gas in order to stretch the polymer. Then, the bubble is collapsed and collected in flat film form.

"Cross direction" refers to the width of a fabric in a direction generally perpendicular to the direction in which it is produced, as opposed to "machine direction" which refers to the length of a fabric in the direction in which it is produced.

"Draw ratio" refers to an amount of stretching and is, more specifically, a ratio of a drawn or stretched length to an original length. For purposes of this invention, the term "draw" is not necessarily equated with molecular orientation.

"Elastomeric" and "elastic" refer to a material or composite which can be elongated by at least 50 percent of its relaxed length and which will recover, upon release of the applied force, at least 40 percent of its elongation. It is generally preferred that the elastomeric material or composite be capable of being elongated by at least 100 percent, more preferably by at least 300 percent, of its relaxed length and recover, upon release of an applied force, at least 50 percent of its elongation.

"Film" refers to a thermoplastic film made using a film extrusion and/or other forming process, such as a cast film or blown film extrusion process. The term includes apertured films, slit films, and other porous or microporous films which constitute liquid/vapor/air transfer films, as well as barrier films which do not transfer liquid.

"Garment" refers to an article of clothing, which may include disposable absorbent garments such as diapers, training pants, feminine hygiene products, incontinence products, other personal care or health care garments, or the like.

"High density polyethylene" and "ultra high density polyethylene" refer to a polyethylene having a density of about 0.941 g/cm$^3$ or greater.

"Laminate" refers to a material made up of two or more layers of material.

"Latent" or "latency" refers to a potentially existing material property that is not presently evident or realized, but can be activated. Some elastic films have a certain amount of "latent" extensibility inherent therein. To activate this extensibility, the film can be heated, causing it to shrink. When pulled, the activated film extends and recovers.

"Latent set" is a measure of the irreversibility of deformation of a specific material prior to activation.

"Low density polyethylene" refers to a branched polyethylene having a density between about 0.910 and 0.940 g/cm$^3$.

"Machine direction" refers to the length of a fabric in the direction in which it is produced, as opposed to "cross direction" which refers to the width of a fabric in a direction generally perpendicular to the machine direction.

"Melt strength" defines the maximum resistance to break of an unorganized polymer stream to a drawing force.

"Orient," "orienting" and "orientation" can apply to molecular orientation or domain orientation, or organized micro- or macrostructure with the polymer matrix, depending on the polymer, and may be reversible.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

"Rheological properties" refer to properties that affect the deformation and flow of a material. Melt strength and draw ratio are examples of rheological properties.

"Stretch" or "stretching" refers to the act of applying an extending force to a material that may or may not undergo retraction.

"Tension set" is a measure of the differential between stepwise stretch levels of a specific stretchable material. In latent materials, tension set is measured after the material has been activated.

"Thermoplastic" describes a material that softens when exposed to heat and which substantially returns to a non-softened condition when cooled to room temperature.

"Ultimate elongation" refers to the elongation at the point of rupture.

"Ultra low density polyethylene" and "linear low density polyethylene" refer to a polyethylene having a density below about 0.910 g/cm$^3$.

DETAILED DESCRIPTION OF THE PRESENTLY PREFERRED EMBODIMENTS

Figure 1:
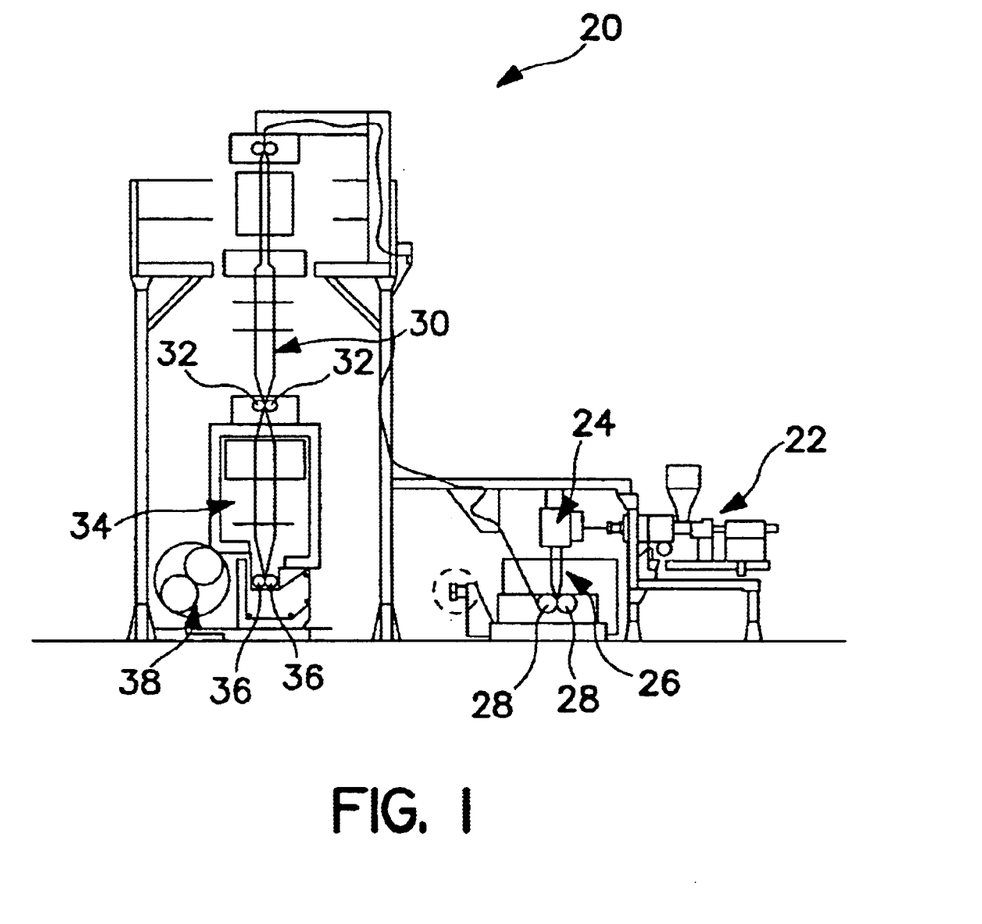
FIG. 1 is a schematic representation of a multiple-bubble apparatus for use in accordance with the method of the invention.
Figure 5:
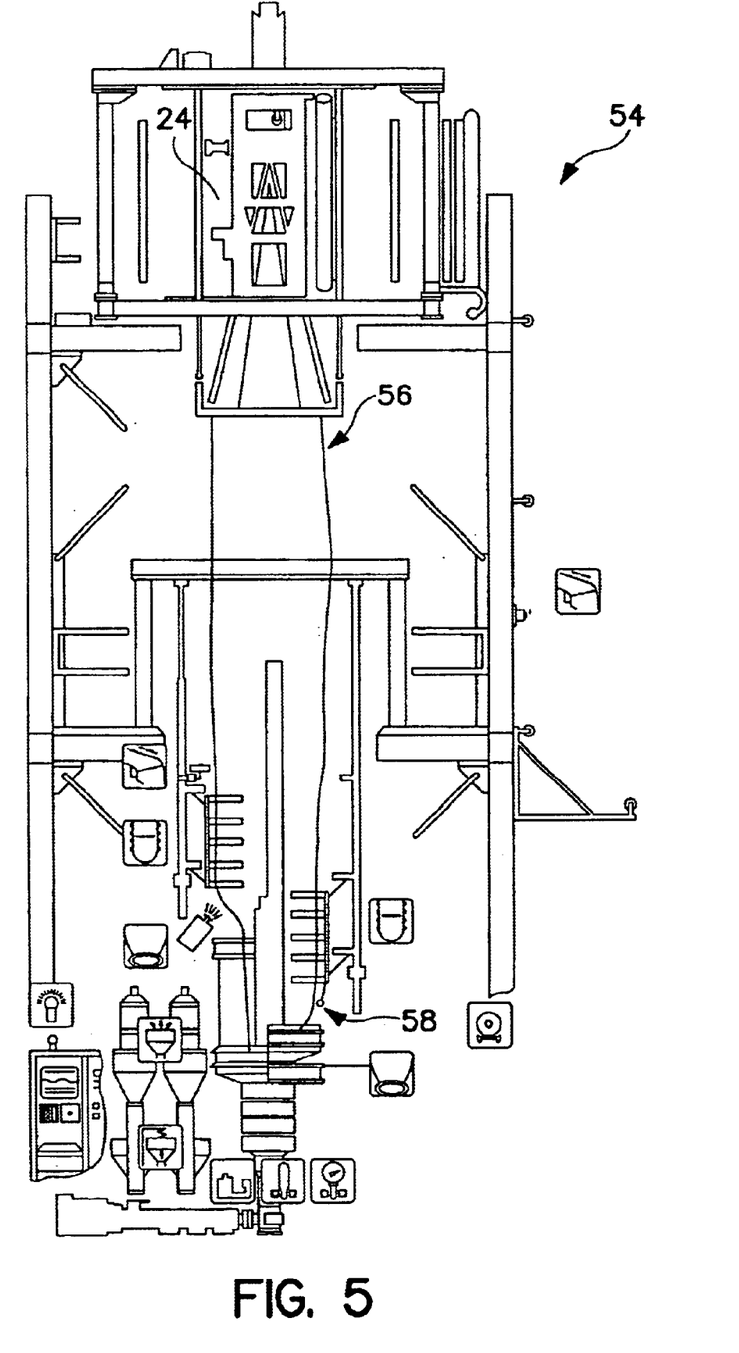
FIG. 5 is a schematic representation of a single-bubble apparatus for use in accordance with the method of the invention.

The method of the invention is a blown film process whereby the temperature gradient is preferentially controlled along the expansion length to form latent elastic, cross-direction-oriented films. Two different types of apparatus can be used to carry out the method of the invention, namely a multiple-bubble apparatus 20, as shown in FIG. 1, or a single-bubble apparatus 54, as shown in FIG. 5. In general, regardless of which type of apparatus is used, the invention is carried out by preparing a film or sheet of a certain thickness, and then stretching or orienting the material at a certain temperature and extension rate, followed by quenching and/or annealing the material.

In the multiple-bubble method, as shown in FIG. 1, for example, a melt stream of a thermoplastic elastomeric material is extruded through an extruder 22 and exits through a blown film die 24 in a conventional manner. The extruded film is blown by conventional techniques to form a first pre-cursor blown bubble 26 where the film is down gauged at elevated temperatures at or above the softening temperature, $T_S$, but below the melt temperature to maintain the solidifiedness in a highly unorganized or amorphous state. A pair of nip release rolls 28 collapses the first pre-cursor blown bubble 26, thus stretching and thinning the film to a desired thickness as the film is then guided downstream to form a second blown bubble 30. When this bubble expansion is done at a certain temperature below the $T_S$, structural organization in the cross direction occurs accordingly. The temperature is typically between a glass transition temperature of the film and the $T_S$.

The second blown bubble 30 is collapsed and transported or further down-gauged by a second pair of nip rolls 32 before being guided through a tubular winding station 38 wherein the formed film is slit to separate the primary layers and wound onto supply rolls. Optionally, the film can be blown an additional number of times to form additional blown bubbles 34, following which it is collapsed and stretched by a third pair of nip rolls 36 prior to being guided through the tubular winding station 38.

The film is down gauged, followed by cross direction orientation at pre-determined stretch, annealing and quench temperatures, as determined by Differential Scanning Calorimetry (DSC). More particularly, DSC can be used to measure thermal transitions of the polymer associated with physical changes as a result of changes in temperature and time. Glass transitions, recrystallization, softening temperature (melt temperature onset) and melting points can be measured with DSC.

Figure 2:
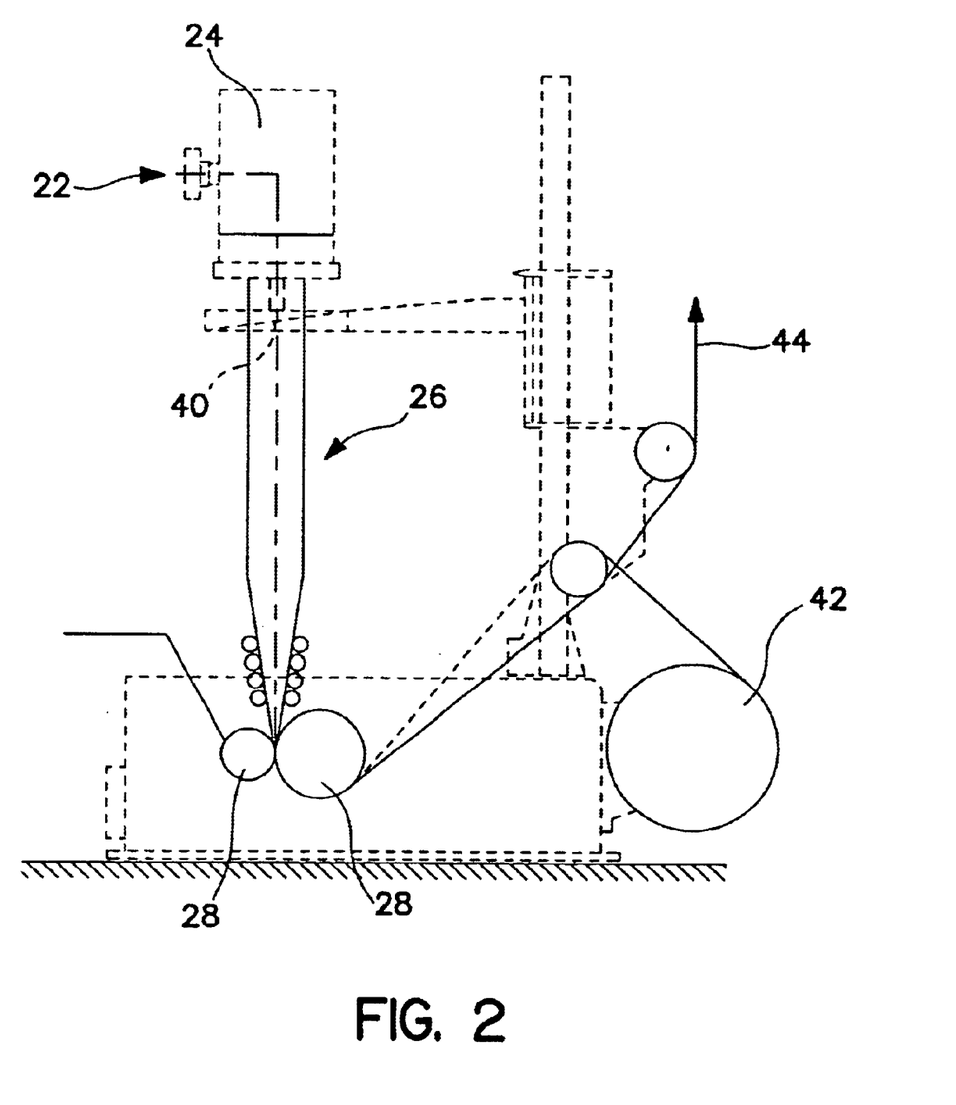
FIG. 2 is a schematic representation of a first bubble in the multiple-bubble apparatus in FIG. 1.

An enlarged view of the first blown bubble 26 in FIG. 1 is shown in FIG. 2. As can be seen in FIG. 2, the film runs from the extruder 22 into the die 24 and is cooled and calibrated by a cooling and calibrating device 40 at the top of the first blown bubble 26. A pair of nip rolls 28 collapses and draws the unoriented film, after which, the collapsed film is directed to the next bubble stage 44 or a finishing system 42.

Figure 3:
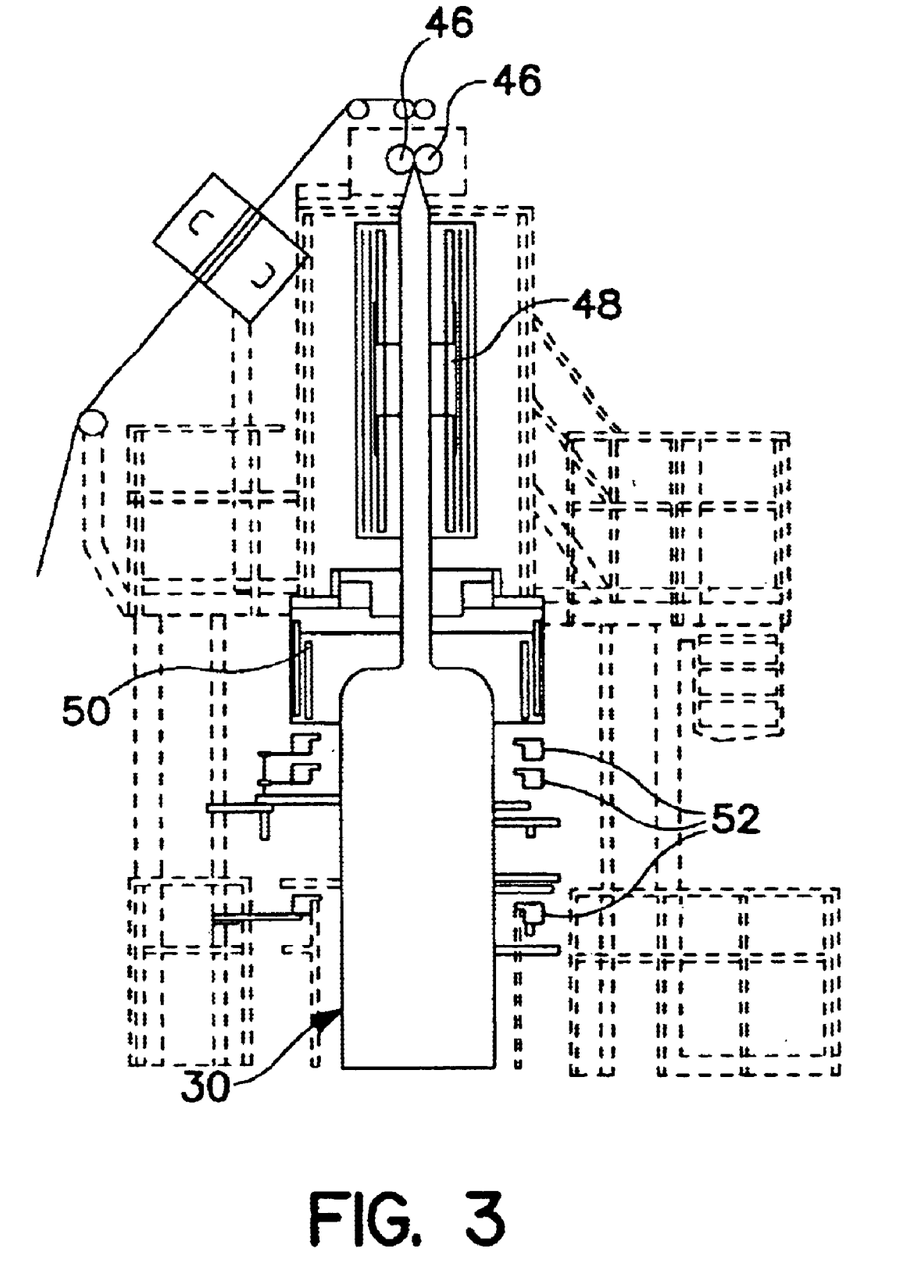
FIG. 3 is a schematic representation of a second bubble in the multiple-bubble apparatus in FIG. 1.

An enlarged view of the second blown bubble 30 in FIG. 1 is shown in FIG. 3. As can be seen in FIG. 3, the film is guided through a pair of tower nip rolls 46, then begins the blowing process again to form the second blown bubble 30. In the initial stages of forming the second blown bubble 30, the film travels through a preheating oven 48, then moves down into a bubble expansion oven 50, at which point the second blown bubble 30 is fully expanded and oriented. The fully expanded second blown bubble 30 is encircled by one or more air cooling rings 52.

Figure 4:
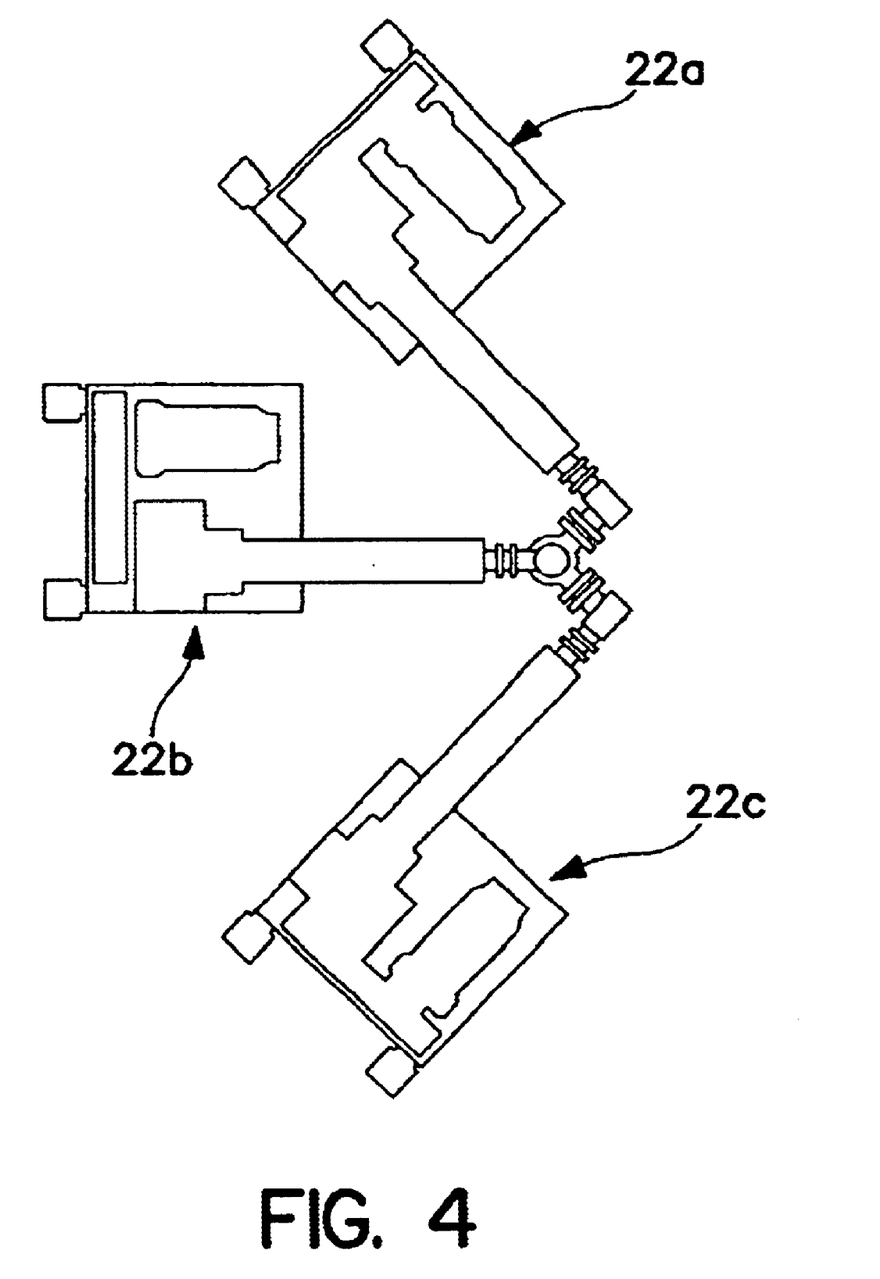
FIG. 4 is an overview of a co-extrusion system for a 3-layer, A/B/X, showing the individual extruders feeding the die.

The multiple-bubble apparatus 20 can include multiple extruders 22 or feedblocks, for example, 4 or 5 extruders or feedblocks. The apparatus shown in FIG. 4 includes three extruders 22. Each extruder 22 can provide a separate layer of the film. In this case, a first extruder 22a can provide a layer A, a second extruder 22b can provide a layer B, and a third extruder 22c can provide a layer X, wherein X can either be the same as A or any other suitable type of layer other than B. The three extruders 22 are connected to a die so that they can simultaneously coextrude a three-layer A/B/X film. Optionally, a single extruder fitted with a multi-manifold die system can produce the layered film.

Suitably, the multiple-bubble apparatus 20 includes at least two bubbles, and occasionally at least three bubbles, particularly where ultra thin films, for example less than 4 mils, is required. Typically, more bubbles are used for greater productivity, and fewer bubbles are used when less productivity is required. An example of a suitable triple-bubble apparatus is a Tube 2000 Model V, available from Polytype America Corporation of Easton, Pa.

Various blow up ratios may be used, but preferably the bubbles are blown to a blow up ratio of between about 1.4:1 and about 2.5:1. The diameter of each bubble is suitably between about 44 and 53.5 inches, with the upper limit of the diameter determined by the size of the iris chamber within the die. The larger the bubble, the greater the orientation that can be imparted to the film.

Figure 6:
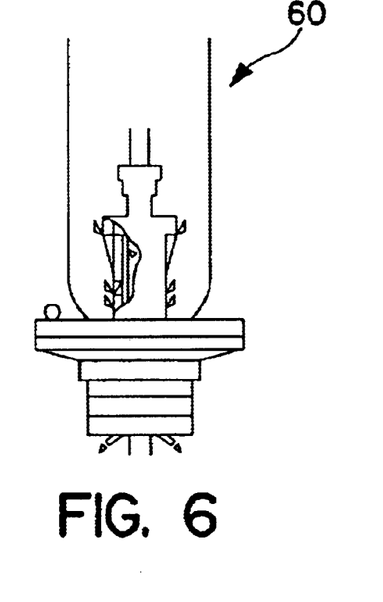
FIG. 6 is an internal bubble cooling apparatus for use in a single-bubble apparatus similar to FIG. 5.
Figure 7:
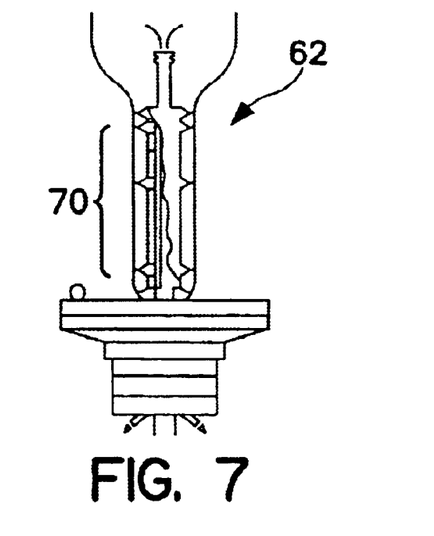
FIG. 7 is an internal bubble cooling apparatus with external air cooling for use in a single-bubble apparatus similar to FIG. 5.
Figure 8:
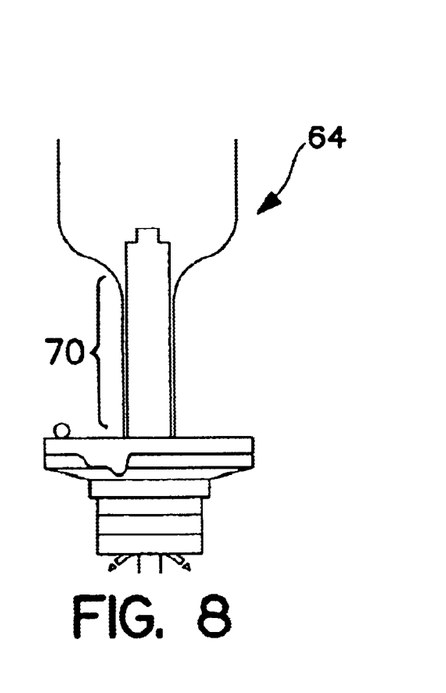
FIG. 8 is an internal cooling system apparatus for use in a single-bubble apparatus similar to FIG. 5.
Figure 9:
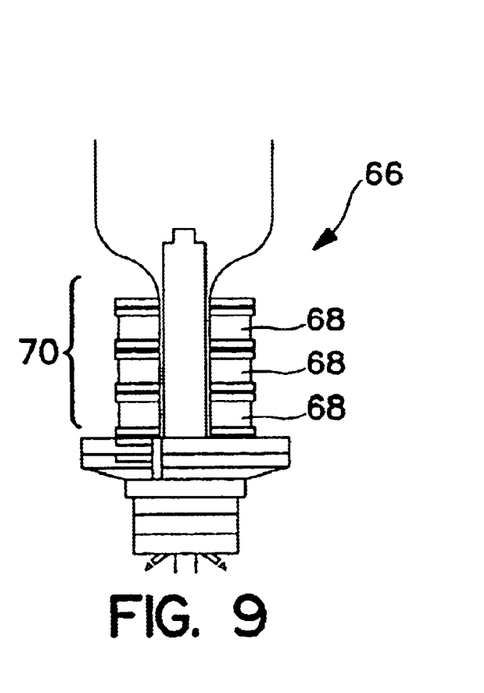
FIG. 9 is an internal cooling system apparatus with external air cooling for use in a single-bubble apparatus similar to FIG. 5.

A single-bubble apparatus 54 is shown alone in FIG. 5. Essentially, the single-bubble process is carried out in nearly the same manner as the multiple-bubble process, but with only one bubble 56. Furthermore, the temperature in the single-bubble process is rigorously regulated through any one or a combination of temperature control systems 58. More specifically, suitable temperature control systems include an internal bubble cooling system 60, as shown in FIG. 6, different internal bubble cooling systems with external air cooling 62, as shown in FIG. 7, an internal cooling system 64, as shown in FIG. 8, and an internal cooling system 66 with external air cooling in the form of a pack of air rings 68, as shown in FIG. 9. Temperature control systems 58 having long necks 70, as shown in FIGS. 7-9, are generally preferred over those not having long necks, as shown in FIG. 6. Long necks 70 cool the film from the inside of the bubble 56 while air rings 68 cool the film externally. Multiple air rings 68 can be used to provide greater temperature control.

In both the multiple-bubble process and the single-bubble process, the film is thinned as much as possible, and oriented. A target thickness is about 0.6 mil or less, with a working range of about 0.2 to about 5 mil, suitably about 0.4 to about 2 mil.

In both the multiple-bubble process and the single-bubble process, the molten film is substantially clear as it exits the extruder. A frost line forms on the bubble, showing a physical manifestation from a viscous state of the film to a solid state film. The frost line is a hazy line that begins to form as the film begins to solidify. Therefore, the frost line can be used to regulate morphology of the film. More particularly, the frost line can be used to track important temperature changes during film expansion.

The blow up ratios and diameters of the single-bubble process can be within the same range as those of the multiple-bubble process. As in the multiple-bubble process, the diameter of the single bubble in the single-bubble process is determined by the size of an iris chamber in the die.

The multiple-bubble process is typically more successful than the single-bubble process, but the single-bubble process is much simpler than the multiple-bubble process.

The material used to form the film in the process of the invention suitably has specific physical and Theological properties. Suitable materials can be determined through four elimination steps, including: (1) ease of processing, (2) shrinkage behavior, (3) optimal tension set and latent set, and (4) melt strength and draw ratio. Desirable latency properties of elastic materials suitable for the process of the invention include high shrinkage, low tension set, and high latent set. Desirable rheological properties of suitable blends include high melt strength and high draw ratio. In general, as temperature increases, draw ratio increases while melt strength decreases. Likewise, as temperature decreases, draw ratio decreases while melt strength increases. By using materials that withstand the four elimination factors above, the process of the invention can be carried out with bubble stability, a high blow up ratio and a very thin film.

The first elimination step is to determine how easily the material can be processed. If the material cannot be processed into a film, more specifically if the material yields low quality film, then the material should not be used with this process. A capillary rheometer, such as an Advanced Capillary Extrusion Rheometer (ACER) available from Rheometric Scientific, Inc. in Piscataway, N.J., can be used to gain an understanding of the processability of a material by providing a measure of molten flow behavior and viscosity dependence under various conditions of shear and temperature encountered during extrusion. More specifically, the pressure required to force molten polymer through a specified orifice at a given rate is measured. Suitably, the pressure of a material that can be used to carry out the process of the invention is in the range of 50 to 5,000 pounds per square inch (psi), more suitably 100 to 2,000 psi, most suitably 200 to 1,000 psi.

The second elimination step is to determine shrinkage performance. Shrinkage is a measure of the recoverable deformation upon heat, radiation or other chemical or mechanical treatments. Both shrinkage and shrink force are key factors in assessing the ability of a latent material to revert to a useful in-product elastic. A very high level of potential shrinkage, for example about 60 to 70%, combined with sufficient shrink force to adequately gather multiple components is suitable for use in the method of the invention. Potential shrinkage can be determined using ASTM D2838. An example of a shrink tension tester for measuring shrink force is Model DCS 205 Shrink Tension Tester available from Dek-Tron, Plainsfield, N.J.

In general, heat activation temperatures for materials suitable for use in the method of the invention are demonstrably higher than 71 degrees Celsius. Activation temperatures must not contribute to instability or degradation in other components in an application, for example a diaper, during conversion.

Percent shrinkage can be calculated from samples stretched to 90% of the ultimate elongation. After being conditioned overnight in a constrained and/or relaxed manner, the samples can then be subjected to heat activated shrinkage at softening temperatures determined from the DSC analysis. Percent shrinkage can be calculated as follows:

$$\% \text{ shrinkage} = (L_{BH} - L_{AH})/L_{BH} \times 100$$

where $L_{BH}$ is the length before activation, and $L_{AH}$ is the length after activation.

One example of a material having suitable shrinkage performance is EXXON® 601 film, available from Exxon Mobil Chemical Co. of Houston, Tex. This film is a tentered film including a blend of ethylene vinyl acetate, ethylene-propylene-diene-monomer and processing oil. Although shrinkage behavior of this material is acceptable, the material's high cost and low elasticity are drawbacks to using this material in the method of the invention. Other materials having suitable shrinkage performance are blends of KRATON® elastomeric resin. KRATON® blends are relatively low-cost, have a desirable retractive force and good elasticity, however, the shrinkage levels of KRATON® are not as optimal as those of EXXON® 601. KRATON® elastomeric resin is available from Shell Chemical Company.

The third elimination step is to determine optimal tension set, latent set and shrinkage. Latent set provides a measure of the irreversibility of deformation. Latent set can be determined from samples at the stage just prior to heat activation. Latent set can be calculated as follows:

$$\% \text{ latent set} = [1 - (L_{AS} - L_{ON})/L_{AS}] \times 100$$

where $L_{AS}$ is the immediate measured length after stretching and removal from the grips and $L_{ON}$ is the final length after conditioning.

Tension set testing can be performed on a Sintech Model 1/s tensile tester. Elongation occurs in a step cycle by stretching the sample, releasing the stress followed by elongation to a greater degree. The elongation sequence used in this testing is suitably 25%, 50%, 100%, 200% and 300%. The set differential between each stepwise stretch level is recorded.

In selecting materials with the optimal balance of performance, the following criteria can be used: high shrinkage (at least 50%), low tension set (no greater than 20%) and high latent set (at least 50%). Examining latent and tension set behavior are especially revealing. Low tension set materials translate to improved fit when used, for example, in absorbent garments. Whereas, high latent set, particularly at reduced draw ratio, is most conducive to high shrinkage development in activating latent materials.

The fourth elimination step is to determine melt strength and draw ratio, or tensile force. Melt strength defines the maximum resistance to break of an unorganized polymer stream to a drawing/stretching force. The resultant draw ratio is a measure of the extensibility and propensity toward orientation of the polymer stream.

An extensional rheometer, such as a RHEOTENS®, available from Goëttfert, Rock Hill, S.C., coupled with a capillary rheometer can be used to determine melt strength of polymer melts. The material being tested can initially be fed into a chamber of the capillary rheometer at a preset temperature ranging from about 200 degrees Celsius to about 250 degrees Celsius. The molten polymer is then extruded through an orifice of the rheometer and fed between two counter-rotating wheels of the extensional rheometer. The particular piston velocity of the capillary rheometer and the particular wheel acceleration of the extensional rheometer appear to have no significant effect on the rheological measurements, thus a wide range of piston velocities and wheel accelerations may be used. However, the length of an extensional rheometer test is determined by the acceleration chosen for the wheels. For purposes of the test, the polymer is melted and formed. If acceleration is too low, the test will run for a very long time before the strand breaks. If the acceleration is too high, the strand will break very quickly. The extensional rheometer is usually adjusted to be underneath the capillary rheometer as close to the die as possible to keep the length of the strand as short as possible. The strength of the strand is affected by the diameter of the strand, the length of the strand, and the temperature of the strand.

Once the wheels reach a velocity of zero, a digital plot can be acquired for melt strength versus increasing pull-off velocity at a constant acceleration of the wheels. The extensional rheometer measures the force to elongate the strand and calculates the tensile stress, draw ratio, rate of elongation and viscosity. The maximum melt strength and velocity can then be obtained at the strand's failure point.

Processing temperature and blend composition noticeably affect performance. In general, melt strength decreases with increasing melt temperature with a corresponding impact on draw ratio. High draw ratio (10+) coupled with high tensile force (30+) is most desirable. Draw ratio, tensile force, elongational stress, elongational viscosity, etc., are calculated with the assistance of the EXTENS® software for data acquisition and analysis. Sufficient draw is necessary to induce high latent set. High melt strength is required to sustain material integrity during the drawing/stretching step. These factors are especially important in blown film processing.

The Sintech Model 1/s tensile tester can be used to test strand, film and laminate materials. Stretch to stop, load at specified elongations and the ultimate tensile and elongation of the material can be determined, suitably using a crosshead speed of 200 mm/minute.

Suitable materials for the method of the invention that were found to pass all four elimination steps include blends of between about 55% and 90% elastomeric resin and between about 10% and 45% polyethylene of various levels of density, more suitably the materials include between about 60% and 85% elastomeric resin and between about 15% and 40% polyethylene, most suitably the materials include between about 65% and 80% elastomeric resin and between about 20% and 35% polyethylene. Examples of suitable elastomeric resins include KRATON® G1730, which is a styrene-poly(ethylene-propylene)-styrene-poly (ethylene-propylene) tetrablock elastomeric copolymer, KRATON® GRP-6571, which is a styrene ethyl/butylene styrene triblock elastomeric copolymer, and KRATON®

D-2122, which is a styrene-butadiene-styrene triblock elastomeric copolymer. All of these KRATON® elastomeric resins are available from Shell Chemical Company. Other suitable resins include styrene/isoprene/styrene block copolymer and styrene/ethylene-propylene/styrene block copolymer. Examples of suitable polyethylenes include Attane 4202, which is an ultra low density polyethylene available from Canada Colors and Chemicals Limited; LDPE 6411, which is a low density polyethylene available from Dow Chemical Co.; Dowlex 2247A, which is a linear low density polyethylene available from Dow Chemical Co.; Petrothene LP5103-00, which is a high density polyethylene available from Equistar Chemicals, LP; AFFINITY® EG8150, which is a metallocene-catalyzed polyethylene available from Dow Chemical Co.; Elvax 3170, which is an ethylene vinyl acetate available from E. I. Du Pont de Nemours Co.; and combinations of any of these polyethylenes. Of these polyethylenes, the preferred polyethylenes include the linear low density polyethylene, the high density polyethylene, and the metallocene-catalyzed polyethylene.

The metallocene, or single-site, process for making polyolefins uses a single-site catalyst which is activated (i.e., ionized) by a co-catalyst.

Polymers produced using single-site catalysts have a narrow molecular weight distribution. "Narrow molecular weight distribution polymer" refers to a polymer that exhibits a molecular weight distribution of less than about 3.5. As is known in the art, the molecular weight distribution of a polymer is the ratio of the weight average molecular weight of the polymer to the number average molecular weight of the polymer. Methods of determining molecular weight distribution are described in the *Encyclopedia of Polymer Science and Engineering*, Volume 3, Pages 299–300 (1985). Polydispersities ($M_w/M_n$) of below 3.5 and even below 2 are possible for single-site produced polymers. These polymers also have a narrow short chain branching distribution when compared to otherwise similar Ziegler-Natta produced polymers.

The cross-direction-oriented elastic film resulting from the invention has a gauge of less than 1 mil, suitably less than 0.6 mil, more suitably less than 0.4 mil. Furthermore, the methods of the invention apply to both single and multi-component, co-extruded films.

While the embodiments of the invention described herein are presently preferred, various modifications and improvements can be made without departing from the spirit and scope of the invention. The scope of the invention is indicated in the appended claims, and all changes that fall within the meaning and range of equivalents are intended to be embraced therein.

What is claimed:

1. A method of producing a latent elastic, cross-direction-oriented film, comprising the steps of:
    extruding a thermoplastic elastomer, wherein the thermoplastic elastomer comprises between about 55% and 90% elastomeric resin and between about 10% and 45% polyethylene;
    blowing the extruded thermoplastic elastomer to form a first blown bubble;
    stretch-thinning the thermoplastic elastomer while blowing the thermoplastic elastomer;
    simultaneously cooling and collapsing the first blown bubble;
    heating and inflating the stretch-thinned thermoplastic elastomer to form a second blown bubble, thereby orienting the thermoplastic elastomer in a cross direction while heating and inflating the thermoplastic elastomer; and
    simultaneously cooling, collapsing, and winding the second blown bubble, thereby forming a latent elastic, cross-direction-oriented film.

2. The method of claim 1, wherein the thermoplastic elastomer is blown and stretch-thinned at a first temperature and is heated, inflated and oriented at a second temperature lower than the first temperature.

3. The method of claim 1, wherein the thermoplastic elastomer is blown and stretch-thinned at a temperature above a softening temperature of the thermoplastic elastomer and below a melt temperature of the thermoplastic elastomer.

4. The method of claim 1, wherein the thermoplastic elastomer is heated, inflated and oriented at a temperature above a glass transition temperature and below a softening temperature of the thermoplastic elastomer.

5. The method of claim 1, further comprising the step of preheating the thinned thermoplastic elastomer prior to forming the second blown bubble.

6. The method of claim 1, further comprising the step of cooling the second blown bubble.

7. The method of claim 1, further comprising the steps of inflating the stretched thermoplastic elastomer to form a third blown bubble and stretching and collapsing the third blown bubble.

8. The method of claim 1, wherein the first blown bubble is blown to a blow up ratio in a range of between about 2.0:1 and about 2.5:1.

9. The method of claim 1, wherein the second blown bubble is blown to a blow up ratio in a range of between about 1.4:1 and about 2.5:1.

10. The method of claim 1, wherein the thermoplastic elastomer comprises between about 60% and 85% elastomeric resin and between about 15% and 40% polyethylene.

11. The method of claim 1, wherein the thermoplastic elastomer comprises between about 65% and 80% elastomeric resin and between about 20% and 35% polyethylene.

12. The method of claim 1, wherein the thermoplastic elastomer comprises an elastomeric resin selected from the group consisting of styrene-poly(ethylene-propylene)-styrene-poly(ethylene-propylene) tetrablock elastomeric copolymer, styrene ethyl/butylene styrene triblock elastomeric copolymer, styrene-butadiene-styrene triblock elastomeric copolymer, styrene/isoprene/styrene block copolymer, and styrene/ethylene-propylene/styrene block copolymer.

13. The method of claim 1, wherein the thermoplastic elastomer comprises a polyethylene selected from the group consisting of ultra low density polyethylene, low density polyethylene, linear low density polyethylene, high density polyethylene, metallocene-catalyzed polyethylene, ethylene vinyl acetate, and combinations thereof.

14. A method of producing a latent elastic, cross-direction-oriented film, comprising the steps of:
    extruding a thermoplastic elastomer, wherein the thermoplastic elastomer comprises between about 55% and 90% elastomeric resin and between about 10% and 45% polyethylene;
    blowing the extruded thermoplastic elastomer to form a single blown bubble;
    stretch-thinning the thermoplastic elastomer while in the form of the single blown bubble, thereby orienting the thermoplastic elastomer in a cross direction;
    cooling the blown bubble; and
    collapsing the blown bubble.

15. The method of claim 14, comprising the step of using an internal bubble cooling system to cool the blown bubble.

16. The method of claim 14, comprising the step of using a combined internal/external bubble cooling system to cool the blown bubble.

17. The method of claim 16, wherein the external air cooling is provided by at least one air ring.

18. The method of claim 14, further comprising the step of heating the thermoplastic elastomer while orienting the thermoplastic elastomer in the cross direction.

19. The method of claim 14, wherein the blown bubble is blown to a blow up ratio in a range of between about 1.4:1 and about 2.5:1.

20. The method of claim 14, wherein the thermoplastic elastomer comprises between about 60% and 85% elastomeric resin and between about 15% and 40% polyethylene.

21. The method of claim 14, wherein the thermoplastic elastomer comprises between about 65% and 80% elastomeric resin and between about 20% and 35% polyethylene.

22. The method of claim 14, wherein the thermoplastic elastomer comprises an elastomeric resin selected from the group consisting of styrene-poly(ethylene-propylene) styrene-poly(ethylene-propylene) tetrablock elastomeric copolymer, styrene ethylbutylene styrene triblock elastomeric copolymer, styrene-butadiene-styrene triblock elastomeric copolymer, styrene/isoprene/styrene block copolymer, and styrene/ethylene-propylene/styrene block copolymer.

23. The method of claim 14, wherein the thermoplastic elastomer comprises a polyethylene selected from the group consisting of ultra low density polyethylene, low density polyethylene, linear low density polyethylene, high density polyethylene, metallocene-catalyzed polyethylene, ethylene vinyl acetate, and combinations thereof.

24. A method of producing a latent elastic, cross-direction-oriented film, comprising the steps of:

providing a thermoplastic elastomer comprising between about 55% and 90% elastomeric resin and between about 10% and 45% polyethylene;

extruding the thermoplastic elastomer, blowing the extruded thermoplastic elastomer to form a blown bubble;

stretch-thinning the thermoplastic elastomer, thereby orienting the thermoplastic elastomer in a cross direction;

cooling the blown bubble; and collapsing the blown bubble, thereby producing a film that has a latent set of at least 50%, a tension set of less than about 20%, shrinkage of at least 50%, a draw ratio of at least 10, and a tensile force of at least 30.

25. The method of claim 24, wherein the thermoplastic elastomer comprises between about 60% and 85% elastomeric resin and between about 15% and 40% polyethylene.

26. The method of claim 24, wherein the thermoplastic elastomer comprises between about 65% and 80% elastomeric resin and between about 20% and 35% polyethylene.

27. The method of claim 24, wherein the thermoplastic elastomer comprises an elastomeric resin selected from the group consisting of styrene-poly(ethylene-propylene)-styrene-poly(ethylene-propylene) tetrablock elastomeric copolymer, styrene ethylbutylene styrene triblock elastomeric copolymer, styrene-butadiene-styrene triblock elastomeric copolymer, styrene/isoprene/styrene block copolymer, and styrene/ethylene-propylene/styrene block copolymer.

28. The method of claim 24, wherein the thermoplastic elastomer comprises a polyethylene selected from the group consisting of ultra low density polyethylene, low density polyethylene, linear low density polyethylene, high density polyethylene, metallocene-catalyzed polyethylene, ethylene vinyl acetate, and combinations thereof.

29. The method of claim 24, wherein the thermoplastic elastomer displays a level of potential shrinkage in a range of from about 60% to about 70%.

30. The method of claim 24, wherein the latent elastic, cross-direction-oriented film has a gauge of less than 1 mil.

31. The method of claim 24, wherein the latent elastic, cross-direction-oriented film has a gauge of less than 0.6 mil.

32. The method of claim 24, wherein the latent elastic, cross-direction-oriented film has a gauge of less than 0.2 mil.

* * * * *